United States Patent
Scartozzi

(10) Patent No.: US 6,703,155 B2
(45) Date of Patent: Mar. 9, 2004

(54) POWER TAP DEVICE, FUEL CELL STACK, AND METHOD OF DIVIDING A FUEL CELL STACK

(75) Inventor: John P. Scartozzi, Spokane, WA (US)

(73) Assignee: Avista Laboratories, Inc., Spokane, WA (US)

(*) Notice: Subject to any disclaimer, the term of this patent is extended or adjusted under 35 U.S.C. 154(b) by 127 days.

(21) Appl. No.: 09/986,806

(22) Filed: Nov. 13, 2001

(65) Prior Publication Data

US 2003/0091884 A1 May 15, 2003

(51) Int. Cl.⁷ .............................. H01M 8/10; H01M 2/08
(52) U.S. Cl. .................... 429/32; 429/34; 429/37
(58) Field of Search ........................... 429/32, 34, 35, 429/37, 26; 320/122, 167

(56) References Cited

U.S. PATENT DOCUMENTS

| | | | |
|---|---|---|---|
| 4,590,135 A | 5/1986 | Warszawski et al. | 429/38 |
| 4,599,282 A | 7/1986 | Hirota et al. | 429/26 |
| 4,689,280 A | 8/1987 | Gionfriddo | 429/34 |
| 5,170,124 A | 12/1992 | Blair et al. | 324/434 |
| 5,230,966 A | 7/1993 | Voss et al. | 429/26 |
| 5,242,764 A | 9/1993 | Dhar | 429/30 |
| 5,601,936 A | 2/1997 | Dudfield et al. | |
| 5,621,607 A | 4/1997 | Farahmandi et al. | |
| 5,738,919 A | 4/1998 | Thomas et al. | |
| 5,783,928 A | 7/1998 | Okamura | |
| 5,858,569 A | 1/1999 | Meacher et al. | 429/26 |
| 5,972,530 A | 10/1999 | Shelekhin et al. | 429/26 |
| 5,981,098 A | 11/1999 | Vitale | 429/34 |
| 6,013,386 A | 1/2000 | Lewin et al. | 429/30 |
| 6,017,648 A | 1/2000 | Jones | 429/35 |
| 6,030,718 A | 2/2000 | Fuglevand et al. | 429/26 |
| 6,040,072 A | 3/2000 | Murphy et al. | 429/12 |
| 6,040,076 A | 3/2000 | Reeder | 429/35 |
| 6,096,449 A | 8/2000 | Fuglevand et al. | 429/13 |
| 6,132,895 A | 10/2000 | Pratt et al. | 429/39 |
| 6,140,820 A | 10/2000 | James | 324/434 |
| 6,171,720 B1 | 1/2001 | Besmann et al. | 429/39 |
| 6,190,793 B1 * | 2/2001 | Barton et al. | 429/34 |
| 6,207,308 B1 | 3/2001 | Grasso et al. | 429/26 |
| 6,210,823 B1 * | 4/2001 | Hatoh et al. | 429/30 |
| 6,218,035 B1 | 4/2001 | Fuglevand et al. | 429/30 |
| 6,218,039 B1 | 4/2001 | Mease et al. | 429/37 |
| 6,261,710 B1 | 7/2001 | Marlanowski | 429/34 |
| 6,266,576 B1 | 7/2001 | Okada et al. | |
| 6,281,684 B1 | 8/2001 | James | 324/434 |

FOREIGN PATENT DOCUMENTS

| | | |
|---|---|---|
| EP | 1 128 456 A2 | 8/2001 |
| JP | 04-004761 | 1/1992 |
| JP | 08-222258 | 8/1996 |

* cited by examiner

Primary Examiner—Stephen Kalafut
Assistant Examiner—Raymond Alejandro
(74) Attorney, Agent, or Firm—Wells St. John P.S.

(57) ABSTRACT

A power tap device for use in a fuel cell stack having a plurality of stackable items including separator plates, and membrane electrode assemblies each having an anode and cathode and configured to be respectively stacked between pairs of separator plates, comprises first and second major outer surfaces, the first major outer surface being electrically conductive, the second major outer surface being electrically conductive; and a dielectric separating the first major outer surface from the second major outer surface, wherein the power tap device is sized and arranged to be interposed between stackable items in the stack.

18 Claims, 5 Drawing Sheets

POWER TAP DEVICE, FUEL CELL STACK, AND METHOD OF DIVIDING A FUEL CELL STACK

TECHNICAL FIELD

The present invention relates to fuel cell power generating systems, and to methods of providing electrical power to a load, or to loads at different voltages from a fuel cell power system.

BACKGROUND OF THE INVENTION

Fuel cells are well known in the art. A fuel cell is an electrochemical device which reacts a fuel and an oxidant to produce electricity and water. A typical fuel supplied to a fuel cell is hydrogen, and a typical oxidant supplied to a fuel cell is oxygen (or ambient air). Other fuels or oxidants can be employed depending upon the operational conditions.

The basic process in a fuel cell is highly efficient, and for those fuel cells fueled directly by hydrogen, pollution free. Further, since fuel cells can be assembled into stacks of various sizes, power systems have been developed to produce a wide range of electrical power outputs and thus can be employed in numerous commercial applications. The teachings of prior art patents, U.S. Pat. Nos. 4,599,282; 4,590,135; 4,689,280; 5,242,764; 5,858,569; 5,981,098; 6,013,386; 6,017,648; 6,030,718; 6,040,072; 6,040,076; 6,096,449; 6,132,895; 6,171,720; 6,207,308; 6,218,039; 6,261,710 are incorporated by reference herein.

In a fuel cell, hydrogen gas is introduced at a first electrode (anode) where it reacts electrochemically in the presence of a catalyst to produce electrons and protons. The electrons are circulated from the first electrode to a second electrode (cathode) through an electrical circuit which couples these respective electrodes. Further, the protons pass through an electrolyte to the second electrode (cathode). Simultaneously, an oxidant, such as oxygen gas, (or air), is introduced to the second electrode where the oxidant reacts electrochemically in the presence of the catalyst and is combined with the electrons from the electrical circuit and the protons (having come across the electrolyte) thus forming water. This reaction further completes the electrical circuit.

The following half cell reactions take place:

$$H_2 \rightarrow 2H^+ + 2e- \quad (1)$$

$$(\tfrac{1}{2})O_2 + 2H^+ + 2e- \rightarrow H_2O \quad (2)$$

As noted above, the fuel-side electrode is the anode, and the oxygen-side electrode is the cathode. The external electric circuit conveys the generated electrical current and can thus extract electrical power from the cell. The overall fuel cell reaction produces electrical energy which is the sum of the separate half cell reactions occurring in the fuel cell less its internal losses.

Experience has shown that a single fuel cell membrane electrode assembly of a typical design produces a useful voltage of only about 0.45 to about 0.7 volts D.C. under a load. In view of this, practical fuel cell power plants have been assembled from multiple cells stacked together such that they are electrically connected in series. Prior art fuel cells are typically configured as stacks, and have electrodes in the form of conductive plates. The conductive plates come into contact with one another so the voltages of the fuel cells electrically add in series. As would be expected, the more portions that are added to the stack, the greater the output voltage.

For example, U.S. Pat. No. 5,972,530 to Shelekhin et al. (incorporated herein by reference) describes a fuel cell stack configuration including bipolar fluid flow or separator plates. Each plate includes plate cooling channels and air distribution holes along edges of the assemblies. The bipolar fluid flow plates have a cathode flow field on one major surface (the cathode side), and an anode flow field on the opposite major surface (the anode side). The bipolar fluid flow plates are made of a material that is sufficiently strong to withstand fuel cell operating conditions, that is electrically conductive, and that is chemically inert, such as graphite, titanium, niobium, titanium oxide, stainless steel, carbon composites, or electroplated materials. Membrane electrode assemblies (MEAs) are sandwiched between respective pairs of bipolar fluid flow plates. Each membrane electrode assembly includes a polymer electrolyte membrane (PEM) and electrode material on each side of the PEM. The electrode material on one side of the polymer electrolyte membrane defines an anode and the electrode material on the other side of the polymer electrolyte membrane defines a cathode. The anode is in contact with the anode side of one fuel flow plate in the stack and the cathode is in contact with the cathode side of another fuel flow plate in the stack. While U.S. Pat. No. 5,972,530 describes an air-cooled arrangement, U.S. Pat. No. 5,230,966 (incorporated herein by reference) discloses a liquid cooled arrangement.

In this stack configuration, only a single output voltage is available, while multiple voltages may be desired. It is not convenient to tap voltages from the stack instead of providing a single voltage from the stack as a whole. Traditionally, high voltage outputs from stacks have been desired because power conversion circuitry can be better used with higher voltages. If lower voltages are desired, power conversion circuitry is typically used to convert the output of the stack to the desired voltage. Different customers or users of a fuel cell system may require multiple supplies of smaller voltages than the combined voltage produced a fuel cell stack. The invention described below addresses this issue.

BRIEF DESCRIPTION OF THE DRAWINGS

Preferred embodiments of the invention are described below with reference to the following accompanying drawings.

FIG. 4 is a side view, partly in diagrammatical form, of an alternative fuel cell stack, including valves using which fuel flow to different sections of the stack can be selectively shut off or turned on.

DETAILED DESCRIPTION OF THE PREFERRED EMBODIMENTS

Figure 1:
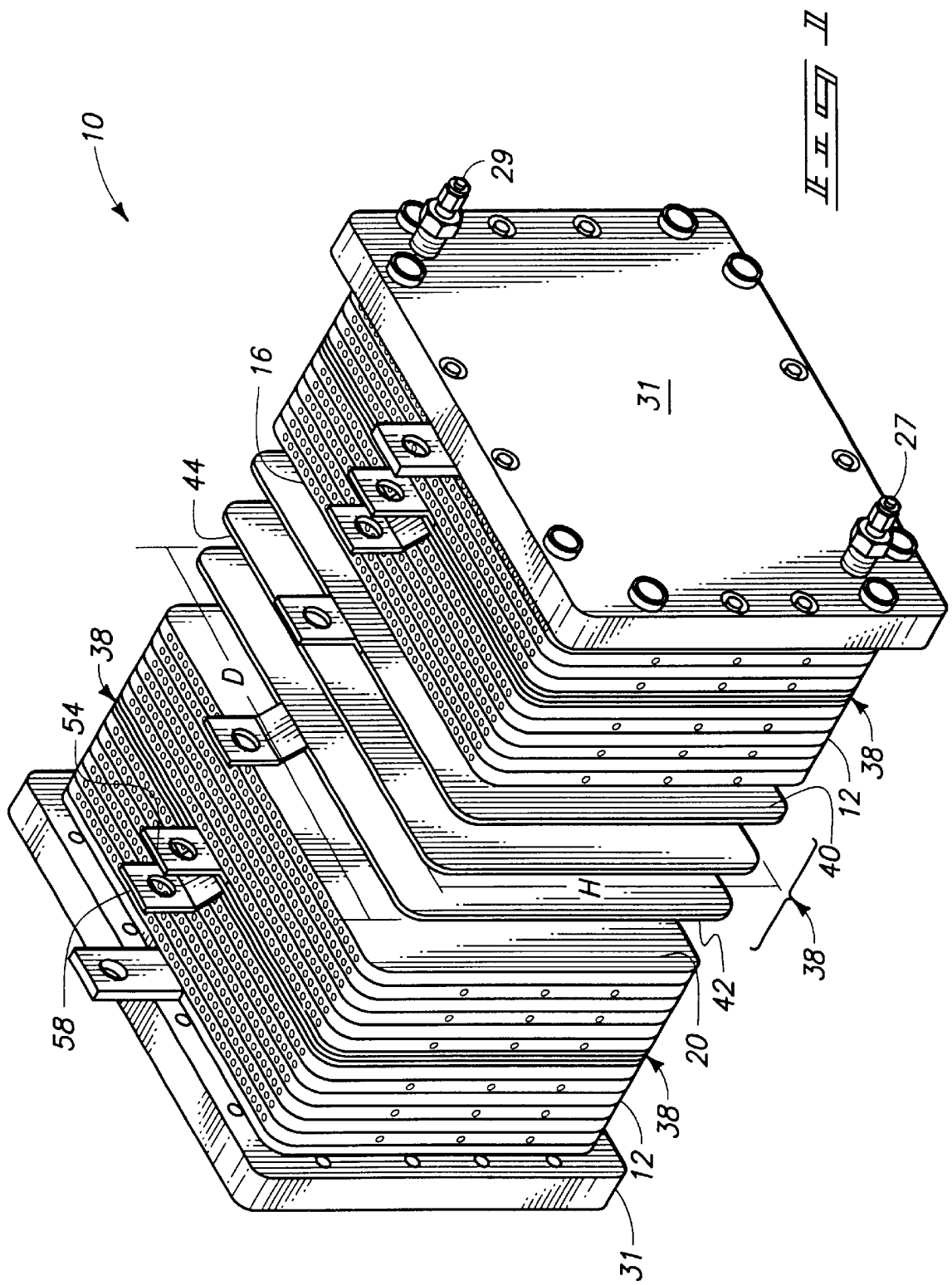
FIG. 1 is an exploded perspective view of a fuel cell stack in accordance with one embodiment of the invention.

This disclosure of the invention is submitted in furtherance of the constitutional purposes of the U.S. Patent Laws "to promote the progress of science and useful arts" (Article 1, Section 8).

The present invention relates to a power tap device for use in a fuel cell stack having a plurality of stackable items including separator plates, and membrane electrode assemblies each having an anode and cathode and configured to be respectively stacked between pairs of separator plates, the power tap device comprising first and second major outer surfaces, the first major outer surface being electrically conductive, the second major outer surface being electrically conductive; and a dielectric separating the first major outer surface from the second major outer surface, wherein the power tap device is sized and arranged to be interposed between separator plates in the stack.

The invention also relates to a power tap device, for use in a fuel cell stack having a plurality of stackable items including separator plates and membrane exchange assemblies each having an anode and cathode and configured to be respectively stacked between pairs of separator plates, the separator plates having respective heights and depths, the power tap device comprising a first electrically conductive plate including a first major outer surface having an overall height and depth configured to generally match the overall height and depth of a separator plate for intimate electrical contact with a separator plate and, and including a first tab integral with and extending from the first major surface to define an electrical contact; a second electrically conductive plate including a second major outer surface having an overall height and depth configured to generally match the overall height and depth of a separator plate for intimate electrical contact with a separator plate and, and including a second tab integral with and extending from the second major surface to define a second electrical contact; and an insulator electrically separating the first electrically conductive plate from the second electrically conductive plate, the first electrically conductive plate and second electrically conductive plate being mounted to the insulator.

Another aspect of the invention relates to a fuel cell stack comprising first and second conductive end plates; a plurality of bipolar separator plates configured to be stacked between the end plates, the separator plates respectively having a depth and a height; a plurality of membrane electrode assemblies each having an anode and cathode and each being configured to be stacked between a pair of separator plates; and a power tap device including first and second electrically conductive major outer surfaces and a dielectric separating the first major outer surface from the second major outer surface, wherein the power tap device has a depth and height generally corresponding to the depth and height of a separator plate and being configured to be stacked between the end plates with the separator plates and membrane electrode assemblies and including a passage to direct fuel from a separator plate on one side of the power tap device to a separator plate on the other side of the power tap device.

Another aspect of the invention relates to a fuel cell stack comprising first and second conductive end plates; a plurality of bipolar separator plates configured to be stacked between the end plates, the separator plates respectively having a depth and a height; a plurality of membrane electrode assemblies each having an anode and cathode and each being configured to be stacked between a pair of separator plates; and a first power tap device including first and second electrically conductive major outer surfaces and a dielectric separating the first major outer surface from the second major outer surface, wherein the power tap device has a depth and height generally corresponding to the depth and height of a separator plate and being configured to be stacked between the end plates with the separator plates and membrane electrode assemblies and including a passage to direct fuel from a separator plate on one side of the power tap device to a separator plate on the other side of the power tap device; a second power tap device including first and second electrically conductive major outer surfaces and a dielectric separating the first major outer surface from the second major outer surface, wherein the power tap device has a depth and height generally corresponding to the depth and height of a separator plate and being configured to be stacked between the end plates with the separator plates and membrane electrode assemblies and including a passage to direct fuel from a separator plate on one side of the power tap device to a separator plate on the other side of the power tap device; and an ultracapacitor electrically coupled between the first major surface of the first power tap device and the second major surface of the second power tap device.

Yet another aspect of the invention relates to a method of dividing a fuel cell stack, of the type configured to produce a voltage and including a stack of separator plates and membrane exchange assemblies each having an anode and cathode, into subsections providing lower voltages, the method comprising providing a plurality of tap assemblies each including first and second major outer surfaces, the first major outer surface being electrically conductive, the second major outer surface being electrically conductive; and a dielectric separating the first major outer surface from the second major outer surface, wherein the power tap device is sized and arranged to be interposed between stackable items in the stack whereby a series electrical connection that would normally be present in the stack is broken by interposing the power tap device wherein each power tap device is sized and arranged to be interposed between two membrane exchange assemblies in the stack; and introducing the power tap device into the stack.

Another aspect of the invention relates to a system comprising a first power tap device for use in a fuel cell stack having a plurality of stackable items including separator plates, and membrane electrode assemblies each having an anode and cathode and configured to be respectively stacked between pairs of separator plates, the power tap device including: first and second major outer surfaces, the first major outer surface being electrically conductive, the second major outer surface being electrically conductive; and a dielectric separating the first major outer surface from the second major outer surface, wherein the power tap device is sized and arranged to be interposed between separator plates in the stack; a second power tap device for use in the fuel cell stack, the second power tap device including: first and second major outer surfaces, the first major outer surface being electrically conductive, the second major outer surface being electrically conductive; and a dielectric separating the first major outer surface from the second major outer surface, wherein the power tap device is sized and arranged to be interposed between separator plates in the stack; and an ultracapacitor electrically coupled between the first major surface of the first mentioned power tap device and the second major surface of the additional power tap device.

These and other aspects of the present invention will be discussed hereinafter.

FIG. 1 shows a fuel cell stack 10, in accordance with one embodiment of the invention, including two or more bipolar separator or fluid flow (or fuel and oxidant distribution) plates 12. The term "plate" is a term of art and is not meant to imply a particular shape. The bipolar plates 12 have anode fluid flow fields or gas distribution channels (not shown) on one major surface (the anode side) 16, and have cathode fluid flow fields or gas or oxidant distribution channels (not shown) on the opposite major surface (the cathode side) 20.

Additionally, in one embodiment, certain plates of the stack have a fluid flow pattern or fields on only one side and hence are monopolar plates instead of being bipolar. More particularly, the stack 10 includes one or more monopolar plates 22 (see FIG. 2) with a fluid flow pattern on an anode side 16' only, and one or more monopolar plates 23 with a fluid flow pattern on a cathode side 20' only. In one embodiment, the monopolar plates 22 with a fluid flow pattern only on the anode side 16' have an anode side 16' that is substantially identical to the anode side 16 and have an opposite side that is generally flat or planar. Similarly, in one embodiment, the monopolar plates 23 with a fluid flow pattern only on the cathode side 20' have a cathode side that is substantially identical to the side 20 and have an opposite side that is generally flat or planar.

The plates 12, 22, and 23 include aligned apertures defining a fuel (e.g., hydrogen) header 25 (see FIG. 2) in fluid communication with the anode side fluid flow fields. The plates 12, 22, and 23 additionally include aligned apertures, spaced apart from the fuel header 25 (see FIG. 2), defining a bleed header 26 in fluid communication with the cathode side fuel flow fields. Oxidant (e.g., air) can be supplied by a compressor via a fitting or coupling 27 (see FIG. 1) coupled to the bleed header 26, or ambient air can be used as an oxidant. In one embodiment, waste water is removed from the bleed header 26; e.g., via the fitting 27. Fuel (e.g., hydrogen or a hydrogen-rich gas) is supplied, in operation, via a fitting or coupling 29 (see FIG. 1) coupled to the fuel header 25.

The plates 12 respectively have (see FIG. 2) a height H and a depth D. In the illustrated embodiment, the plates 22 and 23 respectively have the same heights as the height of one of the plates 12, and the plates 22 and 23 respectively have the same depths as the depth of one of the plates 12.

For the sides of the plates 12, 22, or 23 with fluid flow patterns, any appropriate fluid flow pattern can be employed and many alternatives are shown in the incorporated patents.

The bipolar plates 12, 22, and 23 are electrically conductive, and are made of material capable of withstanding fuel cell operating conditions and that is chemically inert. For example, graphite, titanium, niobium, titanium oxide, stainless steel, carbon composites, electroplated materials, or other structurally or functionally equivalent materials could be employed for the plates.

Figure 2:
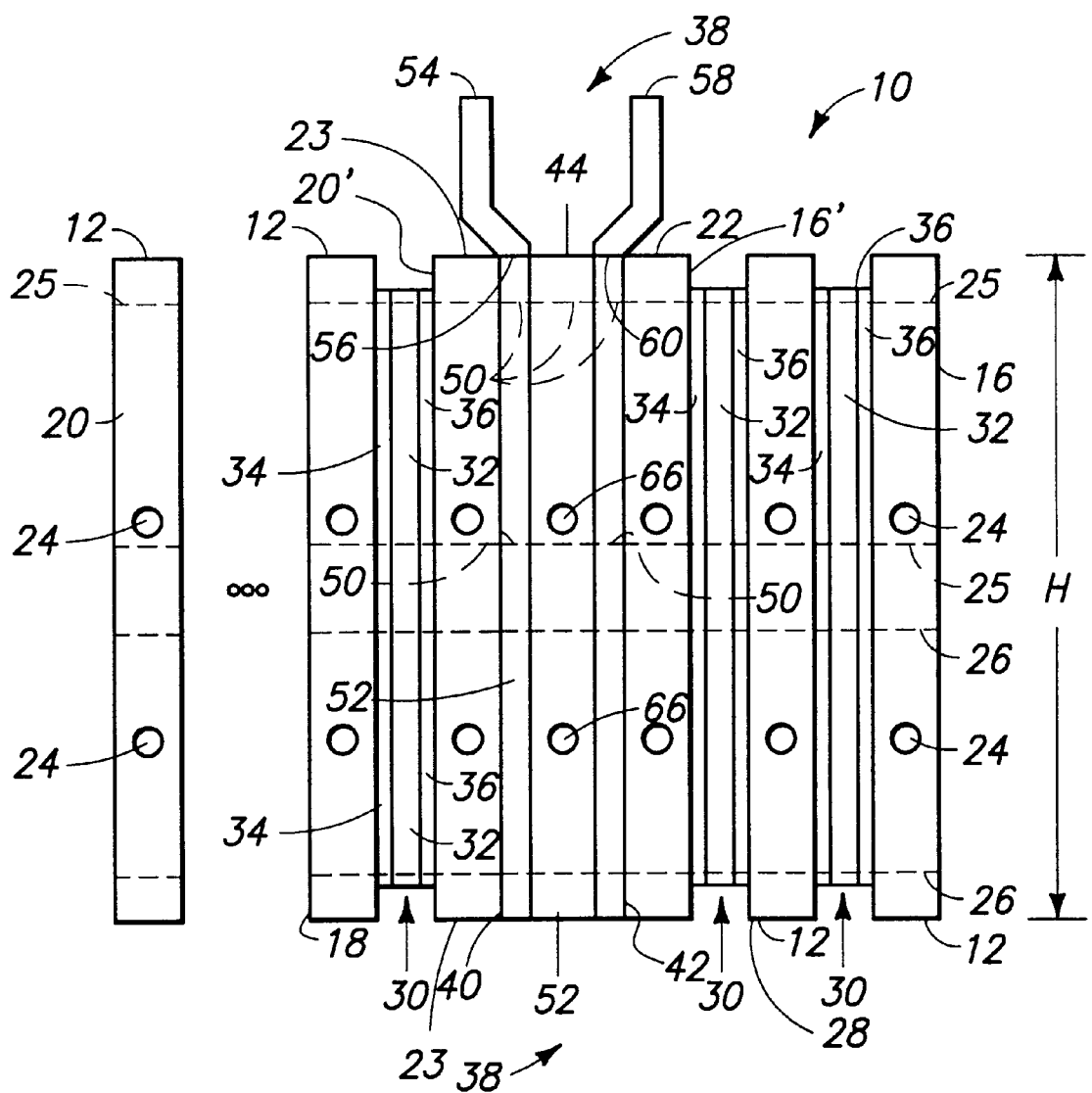
FIG. 2 is a side view, partly in diagrammatical form, of the stack of FIG. 1, illustrating a sample arrangement of components, with end plates not shown.

In the embodiment shown in FIG. 2, plates 12, 22, and/or 23 include plate cooling channels or air distribution holes 24 along edges 28, for air cooling. The channels and air distribution holes 24 can be defined, for example, by drilling or molding. Holes provided in plates for cooling are also described in U.S. Pat. No. 5,972,530, which is incorporated herein by reference.

The fuel cell stack 10 further includes membrane electrode assemblies (MEAs) 30 (see FIG. 2) sandwiched between respective pairs of plates 12; or 12 and 22; or 12 and 23.

The fuel cell stack 10 further includes end plates 31 between which the plates 12, 22, and 23 and membrane electrode assemblies 30 are compressed, when assembled, prior to operation.

FIG. 2 illustrates the order of components included in the stack 10. In operation, the membrane electrode assemblies 30 each have one side in intimate contact with a fluid flow pattern of one plate, and an opposite side in intimate contact with a fluid flow pattern of an adjacent plate. More particularly, each membrane electrode assembly 30 includes a polymer electrolyte membrane (PEM), ion exchange membrane, or proton exchange membrane 32 (see FIG. 2), and electrode layers on each side of the PEM defining an anode electrode 34 and a cathode electrode 36.

In one embodiment, the polymer electrolyte membrane (PEM) 32 is thin, flexible, and sheet-like and made from any material suitable for use as a polymer electrolyte membrane, e.g., Nafion (TM) fluoropolymer, available from Dupont.

The anode electrodes 34 and cathode electrodes 36 are applied (e.g., painted) onto the sides of the polymer electrolyte membranes 32. For example, in one embodiment, the electrode layers 34 and 36 comprise liquid polymer, carbon powder, and a catalyst. In one embodiment, the catalyst used is platinum.

In one alternative embodiment (not shown), each membrane electrode assembly 30 further includes noncatalytic electrically conductive anode and cathode gas diffusion layers inserted or placed on the sides of the polymer electrolyte membranes 32 and/or on the anode and cathode layers 34 and 36 in a manner described in U.S. Pat. No. 6,218,035 to Fuglevand et al., which is incorporated by reference herein.

More particularly, U.S. Pat. No. 6,218,035 to Fuglevand et al. describes a membrane electrode diffusion assembly that has a main body or solid electrolyte membrane. The membrane electrode diffusion assembly has an anode side, and an opposite cathode side. Electrodes, comprising catalytic anode and cathode electrodes are formed on the main body. These individual anode and cathode electrodes are disposed in ionic contact therewith. Still further, a noncatalytic electrically conductive diffusion layer is affixed on the anode and cathode electrodes and has a given porosity. In one embodiment, the noncatalytic electrically conductive diffusion layer has a first diffusion layer which is positioned in ohmic electrical contact with each of the electrodes, and a second diffusion layer which is positioned in ohmic electrical contact with the underlying first diffusion layer. In an alternative form of the membrane electrode diffusion assembly, a third diffusion layer is provided, affixed to the main body prior to affixing the first and second diffusion layers thereto.

The fuel cell stack 10 further includes one or more power tap devices 38 (see FIGS. 1 and 2). The power tap devices 38 respectively include first and second electrically conductive major outer surfaces 40 and 42 and a dielectric 44 separating the first major outer surface 40 from the second major outer surface 42. In the illustrated embodiment, the first and second major outer surfaces 40 and 42 of the power tap device are defined by respective electrically conductive plates. In one embodiment, the electrically conductive plates defining the surfaces 40 and 42 comprise or are formed of copper, metal plating, nickel plating, or other conductive material suitable for use in a fuel cell environment. In one embodiment, the dielectric of the power tap device is defined by plastic, Mylar(™), or other insulating material suitable for use in a fuel cell environment. In one embodiment, the plates 40 and 42 are supported by or mounted to the dielectric 44 (e.g., with screws, bolts, straps, heat-resistant glue or any other appropriate fastener); however, in the embodiment shown in FIG. 1, the plates and dielectric are discrete components that are merely placed side by side and stacked together with the other components of the stack.

The first and second surfaces 40 and 42 of each power tap device 38 have an area and shape equal to or generally corresponding to the area and shape of a major surface 16 or 20 of a plate 12. More particularly, the first and second surfaces 40 and 42 of each power tap device 38 have an overall depth D' equal to or generally corresponding to the depth D of a plate 12, 22, or 23. The first and second surfaces 40 and 42 of each power tap device 38 also have an overall height H' equal to or generally corresponding to the height H of a plate 12, 22, or 23.

Figure 5:
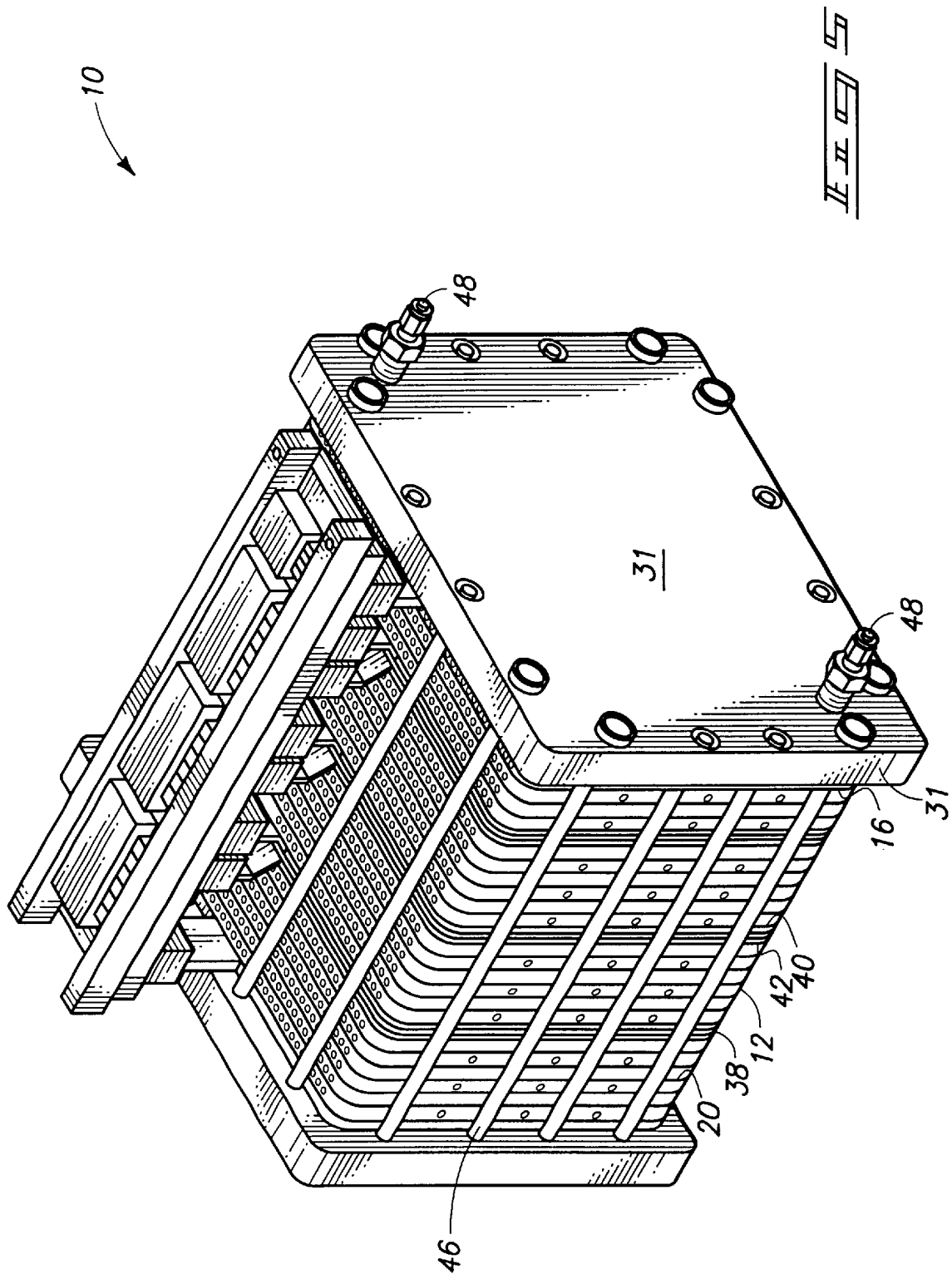
FIG. 5 is an assembled perspective view of a fuel cell stack and circuit bus, in accordance with the embodiment of the invention shown in FIG. 1.

Prior to operation of the stack 10, the power tap device 38 is placed between the end plates 31, along with the plates 12, 22, and 23 and membrane electrode assemblies 30. In one embodiment, the fuel cell stack 10 includes shafts, bolts, or wire 46 (see FIG. 5) extending from one end plate 31 to the other and used to define a frame for supporting the fuel flow plates 12, 22, and 23 and membrane electrode assemblies 30. The fuel cell stack 10 further includes nuts, clamps or other securing hardware 48 used with the bolts 46 to compress the membrane electrode assemblies 30 and plates 12, 22, and 23.

In one embodiment, shown in FIG. 2, each power tap device 38 includes a passage 50, aligned with the apertures in the plates defining the fuel header 25 when stacked with the plates 12, 22, and 23. The passage 50, in operation, directs fuel from a plate 22 on one side of the power tap device 38 to a plate 23 on the other side of the power tap device 38. More particularly, in one embodiment, each power tap device 38 is interposed between monopolar plates 22 and 23 with the planar sides of the plates 22 and 23 in engagement with the conductive surfaces 40 and 42 of the power tap device 38.

The power tap devices 38 include edges 52 that are aligned with or parallel to the edges 28 of the plates 12, 22, and 23, when the plates 12, 22, and 23 and power tap device are clamped between the end plates 31.

Each power tap device 38 further comprises an electrical contact, connector, or tab 54 extending from one edge 56 of the first major conductive surface 40 and an electrical contact, connector, or tab 58 extending from one edge 60 of the second major conductive surface 42. The edge 60 is parallel to (or aligned with or on the same side as) the edge 56 of the first major conductive surface 42. Also, in one embodiment, the tabs 54 and 58 are integrally formed with the respective major surfaces 40 and 42. In one embodiment, all the tabs 54 and 58 of all the power tap 38 devices are on the same side of the stack 10. In the illustrated embodiment, all the tabs 54 and 58 are on the top side of the stack 10; however, in an alternative embodiment, all the tabs 54 and 58 are on the left side, all are on the right side, or all are on the bottom (and edge of the stack are raised up to accommodate tabs 54 and 58 on the bottom).

In one embodiment, shown in FIG. 2, the power tap devices 38 respectively include cooling channels, or air distribution holes 66, for air cooling. The air distribution holes 66 are like the holes 24 in the fuel flow plates 12, 22, and/or 23. In the illustrated embodiment, the plate cooling channels are included in the dielectric 44 of each power tap device 38. The air distribution holes 66 can be defined, for example, by drilling or molding. Holes provided in plates for cooling are also described in U.S. Pat. No. 5,972,530, which is incorporated herein by reference.

Figure 3:
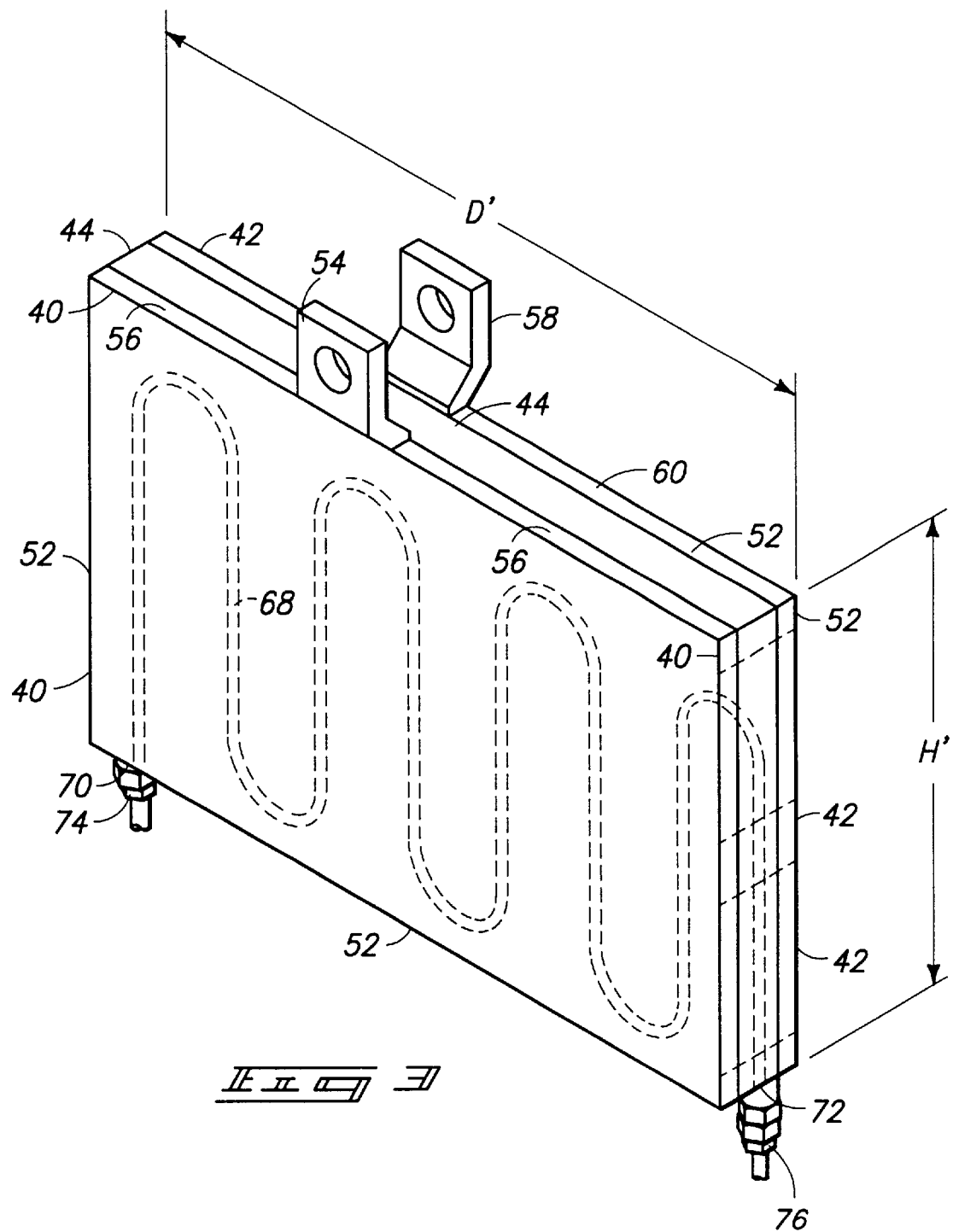
FIG. 3 is an isometric view of an alternative embodiment of the power tap device included in the stack of FIG. 1, having a heat exchanger.

In an alternative embodiment (FIG. 3), one or more of the power tap devices 38 include one or more interior channels or passageways 68 for liquid flow, and liquid cooling is employed. The liquid can be the same liquid used in liquid cooled fuel flow plates 12, 22, and/or 23 and can be, for example, water, ethylene glycol (antifreeze), or any other cooling liquid appropriate for use in a fuel cell stack. The passageway 68 has an entrance 70 and an exit 72. In this liquid cooled embodiment, the power tap device 38 includes a coupling 74 in fluid communication with the entrance 70, and a coupling 76 in fluid communication with the exit 72. Alternative liquid cooling arrangements that could be employed, are described in greater detail, for example, in U.S. Pat. No. 6,261,710 to Marianowski, or in U.S. Pat. No. 5,230,966. In addition, there may be applications where cooling channels or holes are not required.

In one alternative embodiment, instead of the major outer surfaces 40 and 42 of a power tap device 38 being planar and being in contact with monopolar plates 22 and 23, respectively, the first conductive surface 40 of one or more of the power tap devices 38 includes a fluid flow pattern or fluid flow field and is configured for intimate contact with a membrane electrode assembly 30. Alternatively or in addition, the second major surface 42 includes a fluid flow pattern or fluid flow field and is configured for intimate contact with a membrane electrode assembly 30 on the other side of the power tap device 38. In this embodiment, no monopolar plate 22 or 23 is required adjacent any major surface of a power tap device 38 that has a fluid flow pattern. The fluid flow patterns employed on the power tap devices 38 can be substantially identical to the fluid flow patterns on fluid flow plates.

Figure 4:
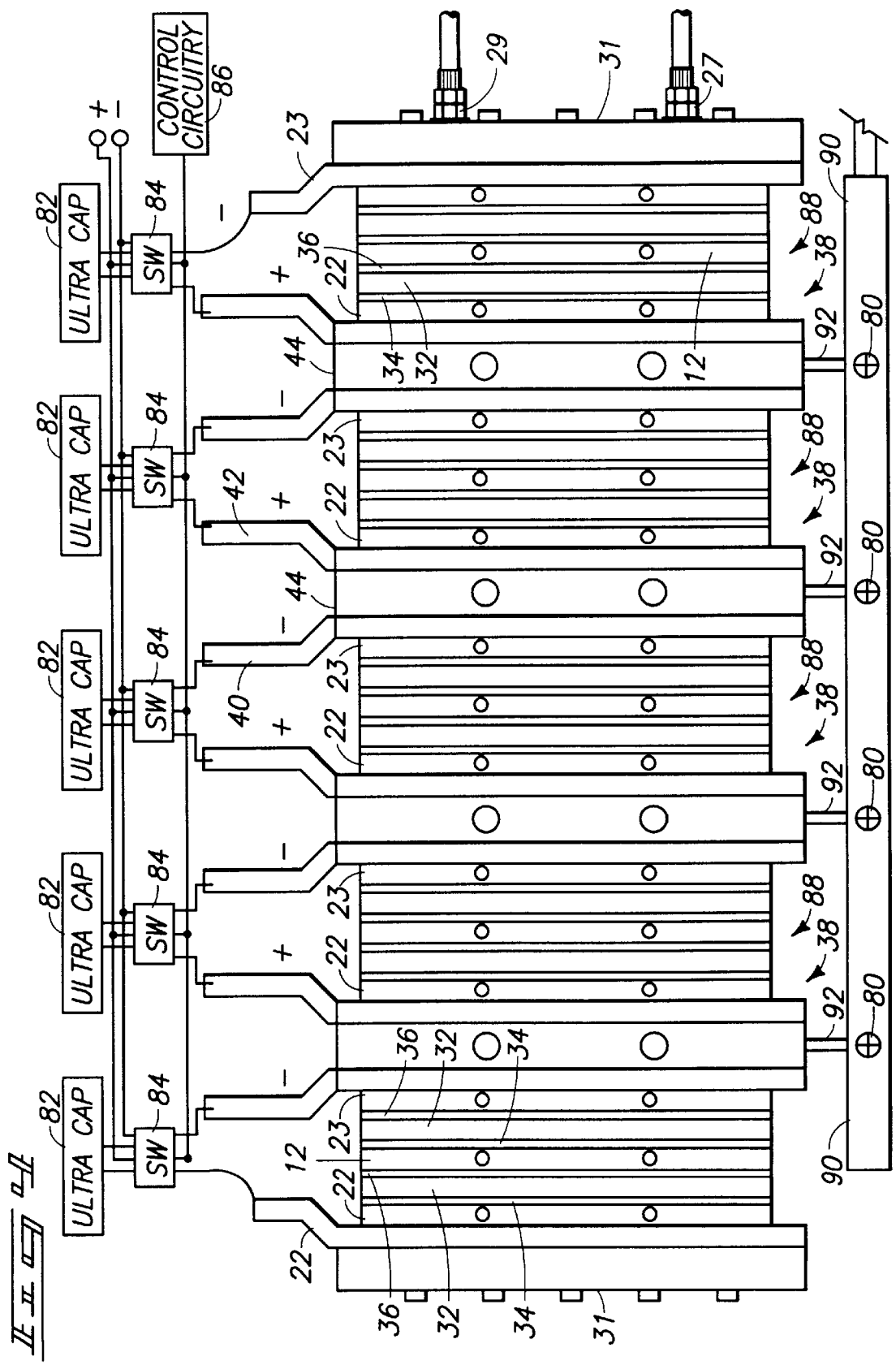

In another alternative embodiment (see FIG. 4), a main feed/bleed manifold 90 is provided adjacent the stack and independent fuel and bleed distribution manifolds 92 are provided to each tapped section 88. Valves 80 are provided for independent control of the supply of fuel to portions of the stack 10 separated by power tap devices 38.

In one embodiment, the power tap devices are equally spaced throughout the stack. For example, a 30 volt stack could be broken into ten 3 volt segments with power tap devices.

A spike in the load that results in an on-line fuel cell's capacity being exceeded can potentially damage components of the fuel cell. Thus, fuel cells have, from time to time, been used in conjunction with charge storage devices, such as batteries, which can provide more instantaneous power for given application needs.

Attention is directed to commonly owned U.S. Pat. Nos. 6.468.682 and 6,497,974 and which are incorporated herein by reference. These patents disclose details of one type of ion exchange membrane fuel cell power system having fuel cell subsystems and a controller that could be coupled to power tap devices in one embodiment of the invention.

Attention is also directed to the currently pending and commonly owned U.S. patent application Ser. Nos. 09/864,409; and 09/864,604 which were filed May 23, 2001, which name William A. Fuglevand as inventor, and which are incorporated herein by reference. These patent applications disclose ultracapacitors and associated circuitry, coupled to fuel cell modules, for handling instantaneous spikes in load demands, for performing DC to AC inversion, and for performing DC to DC conversions and switching.

Ultracapacitors are relatively new. While a large conventional capacitor the size of a soda can may have a capacitance of milliFarads, an ultracapacitor of the same size may be rated at several thousand Farads. In the illustrated embodiment, each ultracapacitor is a PowerCache model PC 2500, which is commercially available from Maxwell Technologies, Inc., Electronic Components Group, 9244 Balboa Avenue, San Diego, Calif. 92123. Other models could, of course, be employed or combinations of different model ultracapacitors could be employed; e.g., if different tapped portions have different voltages.

According to Maxwell, an ultracapacitor or super capacitor, stores energy electrostatically by polarizing an electrolytic solution. An ultracapacitor is also known as a double-layer capacitor. It does not employ chemical reactions to store energy. An ultracapacitor includes two nonreactive porous plates within an electrolyte and is adapted to have a voltage applied across the plates. One of the plates is a positive plate, and the other is a negative plate. The voltage on the positive plate attracts the negative ions in the electrolyte, and the on the negative plate attracts the positive ions, which creates two layers of capacitive storage, one where the charges are separated at the positive plate, and another at the negative plate.

Ultracapacitors behave like high-power, low-capacity batteries except that they store electric energy by accumulating and separating unlike-charges physically, as opposed to batteries which store energy chemically in reversible chemical reactions. Ultracapacitors can provide high power and can accept high power during charging. Ultracapacitors have high cycle life and high cycle efficiency as compared to commercially available chemical batteries. The voltage of an ultracapacitor is directly proportional to its state-of-charge. Therefore, for best operation, the manufacturer recommends that their operating range should be limited to high state-of-charge regions, or control electronics should be provided to compensate for widely varying voltage. As used herein and in the appended claims, the term "ultracapacitor" shall be defined as encompassing electrostatic multiple-layer capacitors (singly or in parallel and/or series combinations), as well as capacitors (single capacitors or parallel and/or series combinations of capacitors) with capacitances above one Farad.

Thus, in one embodiment of the invention, an ultracapacitor 82 is coupled between adjacent power tap devices 38 of the stack 10. Associated switching circuitry 84, as is described in commonly owned U.S. patent application Ser. Nos. 09/864,409; 09/864,526; and 09/864,604 which were filed May 23, 2001, which name William A. Fuglevand as inventor, is coupled to each ultracapacitor 82. Control circuitry or controller 86, which can include, for example, a processor, is coupled to the switching circuitry 84. An ultracapacitor 82 is also electrically coupled between each end plate 31 and the closest power tap device 38 in the stack 10. More particularly, an ultracapacitor 82 is coupled between the first major surface 40 of one power tap device 38 and the second major surface 42 of the adjacent power tap device 38. These are the major surfaces that would be facing each other absent intermediate plates 12, 22, and 23 and membrane electrode assemblies 30. Because each tapped voltage has its own associated energy storage device (ultracapacitor 82), the controller is used, in one embodiment, to ensure that the voltage is maintained for each tapped section 88 of the stack 10 even though the load on each tapped section 88 may vary.

Each ultracapacitor 82 has a maximum voltage rating and an operating voltage range. For example, in one embodiment, an ultracapacitor 82 has a maximum rated voltage of 2.7 Volts DC, has a capacitance of 2500 Farads.

Real-time compensation of voltage to a load is accomplished by switching in and out of various tapped sections 88 of the stack using the switching circuitry 84 and control circuitry 86.

Using multiple tapped sections 88 of one or more stacks 10, the voltage can be regulated to within the voltage of a single tapped section 88. Furthermore, if one or more membrane electrode assemblies 30 fail or if the output voltage declines, the control circuitry 86 can automatically maintain the voltage by switching in other tapped sections 88. The control circuitry 86, in one embodiment having independent fuel control of tapped sections 88, further effects control of the valves 80 so fuel to tapped sections 88 can be controlled and so malfunctioning sections 88 can be shut off.

Optionally, a battery (not shown) is electrically coupled in parallel with each ultracapacitor if long term storage capability is desired for a particular application. In one embodiment, the battery which is associated with each ultracapacitor 82 is a single cell battery. Certain batteries sold in the marine industry, for example, are single cell batteries and can be employed in the illustrated embodiment, while automotive batteries constitute multiple cell batteries. Each battery has a maximum voltage. When both batteries and ultracapacitors 82 are included, the batteries handle lengthy demand peaks and provide long term storage capability while the ultracapacitors 82 handle rapid transients.

The number of membrane electrode assemblies 30 coupled in series across an ultracapacitor 82 is selected, between power tap devices 38, such that the combined voltage of those membrane electrode assemblies 30 is below or no greater than the maximum voltage of the associated battery. Additionally, the membrane electrode assemblies 30 coupled together in series produce a voltage within the operating voltage range of the ultracapacitor 82, for each tapped section 88 of a stack 10. Additionally, the ratio of membrane electrode assemblies 30 to batteries and ultracapacitors 82 is selected appropriately. For example, in one embodiment, if the combined voltage of three membrane electrode assemblies 30 between two power tap devices is 2.2 Volts, though at the high end of the voltage capacity of one single cell battery, is still within the voltage range, and is well within one model ultracapacitor's maximum voltage of 2.7 Volts.

Alternative circuit designs using ultracapacitors, described in U.S. patent application Ser. Nos. 09/864,409 and 09/864,526, can be employed as well with the power tap devices. For example, in one embodiment, one ultracapacitor 82 is provided between each adjacent pair of power tap devices 38 (and/or between a power tap device 38 and an end 31 of the stack) as well as, if desired, between series coupled stacks 10. Sine waves or other waveforms can be created by selectively switching selected ultracapacitors 82 into or out of engagement with a load, to define a DC to AC invertor function.

In one embodiment, sinusoidal distribution of capacity is provided if it is desired to produce a sinusoid. For example, in one embodiment, a number of tapped sections 88 will be coupled in parallel to an ultracapacitor. The number of modules coupled in parallel to any particular ultracapacitor will vary such that more sections 88 are provided to define the base of the sinusoid than near the peak of the sinusoid. Similar capacity distribution can be implemented for waveforms of other shapes.

In operation, a fuel supply (not shown), e.g., a supply of hydrogen gas or hydrogen-rich gas, is disposed in fluid communication with the fuel cell stack 10 and fuel is transmitted via the fuel header 25 to the fluid flow patterns in the plates, to the anode side of each of the membrane electrode assemblies 30. The fuel gas reacts electrochemically in the presence of the catalyst to produce electrons and protons. The electrons travel from the first electrode layer, anode electrode 34, to the second electrode layer, cathode eletrode layer 36, through an electrical circuit connected between the electrode layers 34 and 36. Further, the protons pass through the polymer electrolyte membrane 32 to the second electrode 36. Simultaneously, an oxidant, such as oxygen gas, (or air), is introduced to or available at the second electrode 36 where the oxidant reacts electrochemically in the presence of the catalyst and is combined with the electrons from the electrical circuit and the protons (having come across the proton exchange membrane) thus forming water and completing the electrical circuit.

Thus, a system has been provided wherein taps can be taken within a set of fuel cell membrane exchange assemblies. In one embodiment, fuel gas flow is not interrupted or separated by the power tap devices, but instead fuel gas passed through the power tap device. In an alternative embodiment, tapped sections are controlled independently with respect to fuel supply and/or with respect to coupling of their outputs to a load.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fuel cell stack comprising:
   first and second conductive end plates;
   a plurality of bipolar separator plates configured to be stacked between the conductive end plates, the bipolar separator plates respectively having a depth and a height dimension;
   a plurality of membrane electrode assemblies each having an anode and a cathode side, and each membrane electrode assembly being configured to be stacked between a pair of bipolar separator plates; and
   a power tap device including first and second electrically conductive major outer surfaces and a dielectric layer separating the first electrically conductive major outer surface from the second electrically conductive major outer surface, and wherein the power tap device has a depth and height dimension which generally corresponds to the depth and height dimension of the bipolar separator plates and being configured to be stacked between the conductive end plates with the bipolar separator plates and membrane electrode assemblies, and wherein the power tap device further includes a passageway to direct a source of fuel from one of the separator plates located on one side of the power tap device, to another one of the separator plates located on the other side of the power tap device.

2. A fuel cell stack in accordance with claim 1, and wherein the respective bipolar separator plates comprise bipolar fluid flow plates and monopolar fluid flow plates, and wherein the power tap device is interposed between monopolar fluid flow plates.

3. A fuel cell stack in accordance with claim 1, and further comprising a plurality of bolts which selectively clamp the separator plates and power tap device in given locations between the conductive end plates.

4. A fuel cell stack in accordance with claim 1, and wherein the first electrically conductive major outer surface includes a fluid flow pattern configured for intimate fluid flow contact with an adjacent membrane electrode assembly.

5. A fuel cell stack in accordance with claim 1, and wherein the first and second electrically conductive major outer surfaces have four edges, and wherein the edges of the first electrically conductive major outer surface are generally parallel to the edges of the second electrically conductive major outer surface, and wherein the power tap device further comprises a first electrical contact which extends from one of the edges of the first electrically conductive major outer surface, and a second electrical contact which extends from the edge of the second electrically conductive major outer surface.

6. A fuel cell stack in accordance with claim 1, and wherein the first electrically conductive major outer surface of the power tap device is defined by a metal plate.

7. A fuel cell stack in accordance with claim 6, and wherein the second electrically conductive major outer surface of the power tap device is defined by a metal plate.

8. A fuel cell stack in accordance with claim 7, and wherein at least one of the first and second electrically conductive major outer surfaces of the power tap device comprise copper.

9. A fuel cell stack in accordance with claim 1, and wherein at least one of the first and second electrically conductive major outer surfaces of the power tap device comprise a metal plating.

10. A fuel cell stack in accordance with claim 1, and wherein at least one of the first and second electrically conductive major outer surfaces of the power tap device comprises nickel plating.

11. A fuel cell stack in accordance with claim 1, and wherein the dielectric layer of the power tap device is defined by a layer of plastic.

12. A fuel cell stack in accordance with claim 1, and further comprising a monopolar separator plate having a major outer surface that defines a fluid flow pattern, and an opposite major outer surface, that is generally planar, and wherein the first electrically conductive major outer surface of the power tap device is generally planar and is disposed in contact with the opposite planar major outer surface of the monopolar separator plate.

13. A fuel cell stack in accordance with claim 1, and wherein the power tap device further defines a plurality of air flow passageways which permits air to pass therethrough to cool the fuel cell stack.

14. A fuel cell stack in accordance with claim 1, and wherein the power tap device further defines a liquid flow passageway having an entrance, and an exit, and wherein a first coupling is disposed in fluid communication with the entrance, and a second coupling is disposed in fluid communication with the exit, and wherein the liquid flow passageway allows a liquid to pass therethrough to cool the fuel cell stack.

15. A fuel cell stack in accordance with claim 1, and further comprising a valve for selectively metering the source of fuel to a portion of the stack which is separated by the power tap device.

16. A fuel cell stack comprising:
   first and second electrically conductive end plates;
   a plurality of bipolar separator plates configured to be located in a stacked arrangement therebetween the first and second electrically conductive end plates, and wherein the bipolar separator plates each have a depth and a height dimension;
   a plurality of membrane electrode assemblies each having an anode and a cathode side, and each membrane electrode assembly being configured to be located in a stacked arrangement between a pair of bipolar separator plates;

a first power tap device having first and second electrically conductive major outer surfaces and a dielectric layer separating the first electrically conductive major outer surface from the second electrically conductive major outer surface, and wherein the power tap device further has a depth and height dimension which generally corresponds to a depth and height dimension of the bipolar separator plates, and wherein the first power tap device is configured to be stacked between the first and second electrically conductive end plates, and along with the bipolar separator plates and the plurality of membrane electrode assemblies, and wherein the first power tap device further defines a passage to direct a source of fuel from a one of the separator plates located on one side of the first power tap device to another of the separator plates located on the opposite side of the power tap device;

a second power tap device having first and second electrically conductive major outer surfaces and a dielectric layer separating the first electrically conductive major outer surface from the second electrically conductive major outer surface, and wherein the second power tap device has a depth and height dimension which generally corresponds to the depth and height dimensions of the bipolar separator plates, and wherein the second power tap device is configured to be stacked between the first and second electrically conductive end plates along with the plurality of bipolar separator plates and the plurality of membrane electrode assemblies, and wherein the second power tap device defines a passage which directs a source of fuel from one of the bipolar separator plates located on one side of the second power tap device to another of the bipolar separator plates on the opposite side of the second power tap device; and an ultracapacitor electrically coupled between the first electrically conductive major outer surface of the first power tap devices, and the second electrically conductive major outer surface of the second power tap device.

17. A fuel cell stack in accordance with claim 16, and further comprising an additional ultracapacitor which is electrically coupled between the second electrically conductive major outer surface of the first power tap device and one of the electrically conductive end plates.

18. A fuel cell stack in accordance with claim 16, and further comprising an ultracapacitor electrically coupled between the first electrically conductive major surface of the first power tap device and one of the electrically conductive end plates.

* * * * *